United States Patent
Havey et al.

(10) Patent No.: US 6,597,346 B1
(45) Date of Patent: Jul. 22, 2003

(54) HAND HELD COMPUTER WITH SEE-THROUGH DISPLAY

(75) Inventors: Gary D. Havey, Maple Grove; Steven A. Lewis, Edina, both of MN (US)

(73) Assignee: Honeywell Inc., Morristown, NJ (US)

( * ) Notice: Subject to any disclaimer, the term of this patent is extended or adjusted under 35 U.S.C. 154(b) by 0 days.

(21) Appl. No.: 09/165,766

(22) Filed: Oct. 2, 1998

(51) Int. Cl.⁷ .................................................. G09G 5/00
(52) U.S. Cl. ........................ 345/169; 345/8; 345/9; 348/60; 348/62; 348/333; 348/333.06; 348/751; 348/214; 348/333.02; 348/376; 396/374
(58) Field of Search ........................... 345/8, 9; 348/60, 348/61, 333, 751, 214, 333.06, 376, 333.02; 396/374

(56) References Cited

U.S. PATENT DOCUMENTS

| | | | |
|---|---|---|---|
| 3,818,125 A | * | 6/1974 | Butterfield .................. 178/6.5 |
| 3,971,013 A | | 7/1976 | Challoner et al. |
| 4,025,903 A | | 5/1977 | Kaufman et al. |
| 4,060,848 A | | 11/1977 | Hyatt |
| 4,224,615 A | | 9/1980 | Penz |
| 4,257,306 A | | 3/1981 | Laflamme |
| 4,274,093 A | | 6/1981 | Judge |
| 4,310,849 A | | 1/1982 | Glass |
| 4,545,023 A | | 10/1985 | Mizzi |
| 4,559,555 A | | 12/1985 | Schoolman |
| 4,636,866 A | | 1/1987 | Hattori |
| 4,639,225 A | | 1/1987 | Washizuka |
| 4,706,117 A | | 11/1987 | Schoolman |
| 4,737,972 A | | 4/1988 | Schoolman |
| 4,758,717 A | | 7/1988 | Shepard et al. |
| 4,905,001 A | | 2/1990 | Penner |
| 4,916,441 A | | 4/1990 | Gombrich |
| 4,931,950 A | | 6/1990 | Isle et al. |
| 4,994,987 A | | 2/1991 | Baldwin |
| 5,003,300 A | | 3/1991 | Wells |
| 5,015,831 A | | 5/1991 | Eastman et al. |
| 5,034,574 A | | 7/1991 | Moss et al. |
| 5,052,504 A | | 10/1991 | Ikeda et al. |
| 5,144,119 A | | 9/1992 | Chadima, Jr. et al. |
| 5,148,155 A | | 9/1992 | Martin et al. |
| 5,175,534 A | | 12/1992 | Thatcher |
| 5,208,449 A | | 5/1993 | Eastman et al. |
| 5,252,950 A | | 10/1993 | Saunders et al. |
| 5,267,181 A | | 11/1993 | George |
| 5,281,957 A | | 1/1994 | Schoolman |

(List continued on next page.)

FOREIGN PATENT DOCUMENTS

| | | |
|---|---|---|
| DE | 19801519 | 7/1998 |
| EP | 0345408 A | 12/1989 |
| EP | 0462013 A | 12/1991 |
| EP | 0540393 A | 5/1993 |
| EP | 0 637 794 A1 | 2/1995 |
| EP | 0821257 A | 1/1998 |
| WO | 95/21408 | 8/1995 |
| WO | 9703434 A | 1/1997 |

OTHER PUBLICATIONS

Product Literature, "The ProView™ 30 Head Mounted Display System", Kaiser Electro–Optics Laser, Inc., 4 pgs., (available at least in Apr. 1997).

(List continued on next page.)

*Primary Examiner*—Richard Hjerpe
*Assistant Examiner*—Ali Zamani
(74) *Attorney, Agent, or Firm*—Michele M. Burris

(57) ABSTRACT

The present invention is a fully functional hand held computer having a see through display. An external viewing arrangement, such as a monocular scope, is used to view the operator's immediate surroundings. Optical images from the scope are superimposed with digital images from a miniature computer display. The resultant image allows the operator to look through the device and view his surrounding while simultaneously viewing and operating the software based applications. The entire device is held like a pair of binoculars and mouse like controls are located adjacent the operator's gripping position.

32 Claims, 8 Drawing Sheets

U.S. PATENT DOCUMENTS

| | | | |
|---|---|---|---|
| 5,285,398 A | | 2/1994 | Janik |
| 5,305,244 A | | 4/1994 | Newman et al. |
| 5,394,517 A | * | 2/1995 | Kalawsky .................. 395/129 |
| 5,432,510 A | | 7/1995 | Matthews |
| 5,450,596 A | | 9/1995 | Felsenstein |
| 5,491,651 A | | 2/1996 | Janik |
| 5,550,585 A | * | 8/1996 | Cherri ....................... 348/207 |
| 5,572,343 A | | 11/1996 | Okamura et al. |
| 5,579,165 A | | 11/1996 | Michel et al. |
| 5,638,202 A | | 6/1997 | Rofe |
| 5,825,675 A | | 10/1998 | Want et al. |
| 5,964,830 A | | 10/1999 | Durrett |
| 6,088,053 A1 | * | 1/2001 | Hammack et al. ............ 348/61 |
| 6,181,302 B1 | * | 1/2001 | Lynde ............................ 345/7 |
| 6,181,371 B1 | * | 1/2001 | Maguire, Jr. ................ 348/121 |
| 6,233,094 B1 | | 5/2001 | Tsuda ......................... 359/400 |

OTHER PUBLICATIONS

C. Murray, "Head–Mounted Display Simplifies Surgery", *Design News*, pp. 102–103, Aug. 11, 1997.

D. Baum, "VIMAD," *Scientific Honeyweller*, 5(2), pp. 45–51, Jun. 1984.

J. Robertson, "Remote users eye tiny FPDs," *Electronic Buyers News*, May 1997.

Product Literature, "Advanced Flat Panel Head Mounted Display Program", *R&D Programs, Electronics Technology Office*, http://esto.sysplan.com, 2 pgs., (accessed via internet Apr. 1997) (last updated Apr. 1996).

Product Literature, "HIDEF Family", *KEO*, http://www.keo.com, 2 pgs., (accessed via internet Apr. 1997).

Product Literature, "Kaiser Electro–Optics", *KEO*, http://www.keo.com, 4 pgs., (accessed via internet Apr. 1997) (copyright 1997).

Product Literature, "Full Immersion Head Mounted Display (FIHMD)", *ISO Planning & C3 Program Portfolio*, http://maco.dc.isx.com, 2 pgs., (accessed via internet Apr. 1997).

Product Literature, "Head Mounted Display", http://ece.clemson.edu, 1 pg., (accessed via internet Apr. 1997).

Product Literature, "Head Mounted Displays (HMD)", *R&D Programs, Electronics Technology Office*, http://esto.sysplan.com, 3 pgs., (accessed via internet Apr. 1997).

Product Literature, *Intervision*, http://www.intervisionsystems.com, 6 pgs., (accessed via internet May 1997) (copyright 1995, 1996).

Product Literature, "Look Past Today With Trekker™", *Personal Information Systems*, http://www.cacd.rockwell.com, 4 pgs., (accessed via internet May 1997) (copyright 1996).

Product Literature, "Boeing Wearable Computer Workshop Breakout Session Summary", *Boeing Wearable Computer Workshop*, http://www.cs.smu.edu, 3 pgs., (accessed via internet May 1997).

Product Literature, "The MIT Wearable Computing Page", http://lcs.www.media.mit.edu, 4 pgs., (accessed via internet May 1997).

Product Literature, "Wearable Computing Research Group", *University of Oregon Computer & Information Science*, http://www.cs.uoregon.edu, 2 pgs., (accessed via internet May 1997) (last updated Jan. 1997).

Product Literature, "Electronic Performance Support System", *EPSS*, http://mime1.marc.gatech.edu, 6 pgs., (accessed via internet May 1997) (last updated Apr. 1997).

Product Literature, "Shape Deposition Manufacturing", http://www–rpl.stanford.edu, 2 pgs., (accessed via internet May 1997).

Product Literature, "The DeVry Student Chapter I.E.E.E. Official Wearable Computer Homepage", http://www.devrycols.edu, 3 pgs., (accessed via internet May 1997) (copyright 1997).

Product Literature, *"Jeff Hartman's Wearable Computer Technical page:"*, http://www.netwalk.com, 2 pgs., (accessed via internet Apr. 1997) (Last updated Jan. 1997) (copyright 1996).

Product Literature, "The Ultimate Portable Computer?", *News & Views*, Copyright 1994–1997, http://www.byte.com, 2 pgs., (accessed via internet Apr. 1997) (copyright 1994–1997).

Product Literature, *"Oregon Wearable Computer Wiring Diagram,"* http://www.cs.uoregon.edu/research/wearables/Oregon/netman3.gi, 3 pgs., (accessed via internet May 1997).

Product Literature, "Details about the WetPC™," *WetPC (tm) diagrams*, http://www.aims.gov.au/pages/wetpc/wpcdiag.html, 1 pg., (accessed via internet May 1997) (last updated Jan. 1997).

Product Literature, "Commercialising the Technology," *WetPC (tm) commercialisation*, http://www.aims.gov.au/pages/wetpc/wpccom.html, 2 pgs., (accessed via internet May 1997) (last updated Jan. 1997).

Product Literature, "Technical backgrounder," *WetPC (tm) Backgrounder*, http://www.aims.gov.au/pages/wetpc/wpcbkgrnder.html#specs, 5 pgs., (accessed via internet May 1997) (last updated Jan. 1997).

Product Literature, Wearable, Tetherless, Computer–Mediated Reality (with possible future applications to the disabled), http://www.wearcam.org/tetherless/, 1 pg., (accessed via internet May 1997).

Product Literature, "General Information," *General Information—On–Site Wearable Computer Systems*, http://www.cs.cmu.edu/afs/cs.cmu.edu/project/vuman/www/general.html, 2 pgs., (accessed via internet May 1997) (last updated Jun. 1995).

Product Literature, *"About Xybernaut Corporation & The Mobile Assistant II®,"* http://wwww.xybernaut.com/about1.html, 5 pgs., (accessed via internet May 1997).

Product Literature, "WS 1000 Wearable System with RS 1 Ring Scanner," *WS 1000 Wearable System with RS 1 Ring Scanner*, http://www.symbol.com/ST000262.HTM, 8 pgs., (accessed via internet May 1997).

Product Literature, "RS 1 Ring Scanner," *RS 1 Ring Scanner*, http://www.symbol.com/ST000266.HTM, 5 pgs., (accessed via internet May 1997).

Product Literature, "A Cyberscreen So Tiny It Fits On A Dime," *Business Week*, p. 126C, Apr. 21, 1997.

Product Literature, "Wearable Computer," *Appliance Manufacturer*, p. 8, Mar. 1996.

D P Siewiorek, "Wearable Computers: Merging Information Space with the Workspace," Proceedings of the Intl. Conf. On Computer Design: VLSI In Computers And Processors, Cambridge, MA. (Oct. 3–6, 1993).

Asim Smailagic et al., "Modalities of Interaction with CMU Wearable Computers," *IEEE Personal Communications*, 3 (Feb. 01, 1996).

J. Rekimoto et al., "The World Through the Computer: Computer Augmented Interaction with Real World Environments: UIST '95." 8th Annual Symposium on User Interface Software and Technology. Proceedings of the ACM Symposium on User Interface Software and Technology, Pittsburgh, PA (Nov. 14–17, 1995).

\* cited by examiner

HAND HELD COMPUTER WITH SEE-THROUGH DISPLAY

BACKGROUND OF THE INVENTION

This invention relates generally to hand held computers and more specifically to hand held computers having a see-through display.

DESCRIPTION OF THE RELATED ART

One of the primary goals of modern electronics has been to reduce the size of preexisting components. Computer design is a classic example of this trend. Computers have evolved from the room size behemoths of the past to the widely recognized desk-top models of today. The current trend is to take such personal computers one step further by making them easier to transport and work with. Laptop computers have been around for some time and are quite well-known. Laptops generally have the same processing capabilities as desk-top versions and are also capable of providing similarly high resolution displays. Another example in this evolution has been the advent of the personal digital assistant (PDA). These devices comprise hand held terminals and some sort of graphical interface/display. To date, these devices are substantially less powerful than their desktop and laptop counterparts, but are none the less useful tools for many applications.

While these various devices have proven to be extremely popular and very useful, they do have their limitations. One of the primary drawbacks is the size of the display. In the case of laptop computers the display represents approximately half of the entire shell of the computer. In the case of the PDA, the display is also rather large, comparatively. The PDA devices can be obtained in a variety of keypad/display configurations; however, the displays will always be larger than a de facto industry standard so that the operator can view and perceive a practical amount of information per screen. Finally, while the display in the PDA is usually smaller than the laptop display, it also has a significantly lower resolution making it impractical for many personal computing functions.

To some extent these smaller scale, portable displays represent the current practical limits of display technology. It is possible to produce very small high resolution displays; however, these devices are generally wasted because the human eye cannot comprehend detail on such a small scale. As an example, there are commercially available displays that are approximately 0.6" by 0.5", or roughly the size of a dime, and display 1000 lines per inch. Such a display is capable of resolutions comparable to desktop monitors (640×480, or greater). Yet, when viewed by itself with the naked eye, all that is perceived is a veritable blur. What this means to the computer industry is that while displays can certainly be improved in quality, they really cannot be marketed as significantly smaller stand alone direct view displays.

It would be desirable to have a stand alone, high resolution display on the order of the size of a watch face, as there are many applications where this would be extremely beneficial. For instance, in today's military, an individual soldier can gain great benefit and realize increased performance by carrying with him a personal computer. However, it simply would not be feasible to expect or require a soldier to carry a bulky laptop in field conditions. The laptop would be cumbersome and would prevent the soldier from simultaneously carrying out other duties as well as hindering his personal ease of movement. A personal computer in the form of a PDA would be more practical than a laptop style computer, however, the PDA would still distract the soldier by taking his concentration away from other critical duties to focus on the personal digital assistant. Furthermore, the display generates a fair amount of light which would often prevent soldiers in the field from being able to use the device without running the risk of being detected. Finally, these displays usually become very difficult to view in outdoor lighting conditions. Therefore, it is clear that current displays are impractical to use in many field conditions and that even though it would be desirable and technologically possible, miniature displays do not solve this problem because of the perceptual limits of human vision.

There are also many other applications where it would be beneficial to simultaneously view a display and certain background information. In general, it is often helpful to have various types of data superimposed onto a real world view. The simplest form of this, conceptually, would be the combination of two separate video images. While creating special effects for a motion picture, actors often perform in front of a blue (or green) screen. Subsequently, the actors performance is combined with a specially created matte, which contains background imagery, to produce a complete composite image. It is often difficult for the actor(s) to perform with no other visual reference and equally challenging for the director to control the scene. Therefore, the intended background is shown on a monitor and a video output from a video camera (which records the same view as the film camera) is displayed on the same monitor. The resultant layered image, though crude, provides the participants with a preview of the final result.

A similar application is the direct combination of electronic data with an operator's view of his current surroundings. Ideally, the operator would have a variety of data options to chose from and would also have the ability to input data back into the system.

Currently, the only commercially practical system available to accomplish such simultaneous viewing would be the connection of a digital camera to a computer system. The digitized image(s) can then be viewed or manipulated with the computer, alone or in combination with other graphical information being displayed. However, the problem still remains of reducing the overall size of the entire system to make it practical for personal/field use. Further, the image must be viewed on the computer screen as opposed to real time viewing of the actual object. It may be more beneficial for the operator to view the real world and have an image superimposed on that view, as opposed to collecting the images and reproducing them on a computer monitor. That way, the operator can have far better control over their field of view (i.e., they can easily select the images they wish to combine).

There are a limited number of applications where data is superimposed directly into an operator's field of view. For instance, certain automobile manufacturers project dashboard information onto the windshield so that a driver can view this information without taking his eyes off the road. Of course, this only provides for viewing the data and not working with it. The ability to manipulate the data requires a more sophisticated link between the real world display and the electronic data display.

One similar technology, which can allow for some control of the electronic data is the helmet mounted or head mounted display. Such devices provide a video display in an eye piece mounted to a helmet which is connected to an external computer/video device. The operator's other eye is left open to view the surroundings. Such a device suffers two major drawbacks. First, the entire system cannot be mounted to the helmet due to the desire to limit the weight placed on the operator's head. Thus, the helmet must be tethered to additional systems. Second, the operator is subjected to viewing a different image with each eye. This could result in a loss of depth perception and also prevents the operator from selectively focusing on either image.

Other helmet mounted displays solve some of these problems by allowing the operator to still use both eyes to view his surroundings. Optical information from a computer/video source is projected onto a partially reflective surface which is positioned in the operator's field of view. The optical data is then reflected directly into the operator's eye. The operator can shift his focus to either detect the data or to focus on his surroundings. Furthermore, since the reflecting surface is only partially reflective, the operator can view directly through it and therefore no portion of his field of view is entirely obscured. This device is also limited in that only the display can be mounted into the helmet and the operator is essentially tethered to a large amount of processing equipment.

Generally, the head mounted displays have been most often used in military applications. The operator is usually a pilot or a tank commander and the display is connected to the on-board computer and navigational equipment. Similar displays could be tethered to more portable computing systems, such as a body worn computer. Alternatively, the display for a body worn computer could be a hand held component. In either case, problems with mobility and a hindrance of the performance of other duties would still occur. When the display is head worn, the device is always in the users field of view and the physical components are always kept in the same location. In addition people generally feel uncomfortable having components attached to their head, especially when coordinated physical activity is required.

It would be more beneficial to be able to selectively view and subsequently store the display, rather than always having to work around it. That feature could be obtained with a hand held tethered display, however, such a display would suffer from the same drawbacks as the laptop and PDA displays discussed above, i.e., in order to be viewable, they must be larger than is practical to carry in field conditions. With either the head mounted display or the tethered hand held display, some sort of control unit must be provided if the operator is going to be able to manipulate the system, which would certainly be desirable and in some applications is required. A completely separate control would have to be added for the head mounded display. The control unit could be added to the hand held display and would simply increase the overall size of the hand held unit. Neither alternative is desirable. Finally, having a unit strapped to one part of an operator's body and tethered to another presents a problem for field use in that the component will often become entangled when moving in a restricted environment.

Therefore, there exists a need to provide a personal computing device having a small but high resolution display which allows the user to simultaneously view the display and his surroundings, while providing for compact use and ease of storage.

SUMMARY OF THE INVENTION

The present invention is a hand held computer having a see through display which allows an operator to look through the device and view his immediate surroundings and simultaneously view a display from an internal computer. The simultaneous view being made possible by having the two views superimposed.

An optical system has an objective lens which gathers light and directs it into a housing. The image passes through a pentaprism where it is inverted, and subsequently directed through an eyepiece lens where it is viewed by the operator.

A fully functioning computer is mounted in the same housing as the optical system. The computer has a video driver which is connected to a miniature display. External controls are mounted on the housing which control the operation of the computer. A color shutter is located adjacent the display in order to produce a color image from the miniature display.

An image combination system takes the color image created by the display and shutter and merges that image with the image produced by the optical system. The merged image is then directed into the pentaprism and what is ultimately viewed by the operator is a combination of the two images superimposed on one another.

DETAILED DESCRIPTION OF PREFERRED EMBODIMENTS

Figure 7:
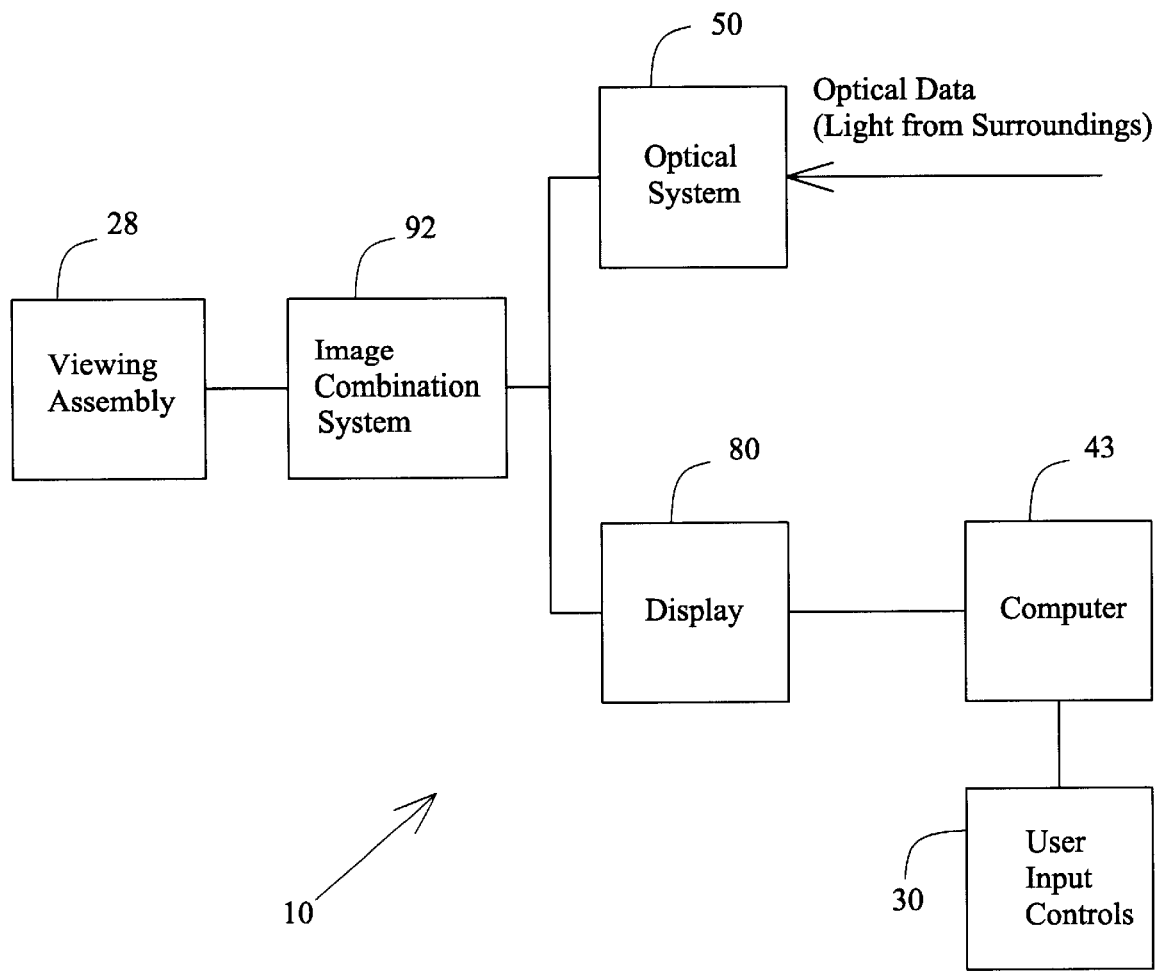
FIG. 7 is a system diagram of a hand held computer having a see through display.

Referring to FIG. 7, an overview of the apparatus of the present invention will be presented. The portable computer 10 has a computer 43 that has user input controls 30. The computer 43 generates a video image on display 80. At the same time, light from the operator's surroundings enter an optical system 50 and form an image therein. The image(s) from the optical system 50 and the image(s) from the display 80 enter the image combination system 92. The image combination system 92 merges the two separate images into a single image by superimposing one on top of the other. The composite image is then directed to a viewing assembly 28 where it can be observed by the operator. The portable computer 10 is contained within a housing 15 (see FIG. 1). By moving the housing 15 and manipulating the user input control 30, the operator can vary and directly control the image being presented by the viewing assembly 28.

Figure 1:
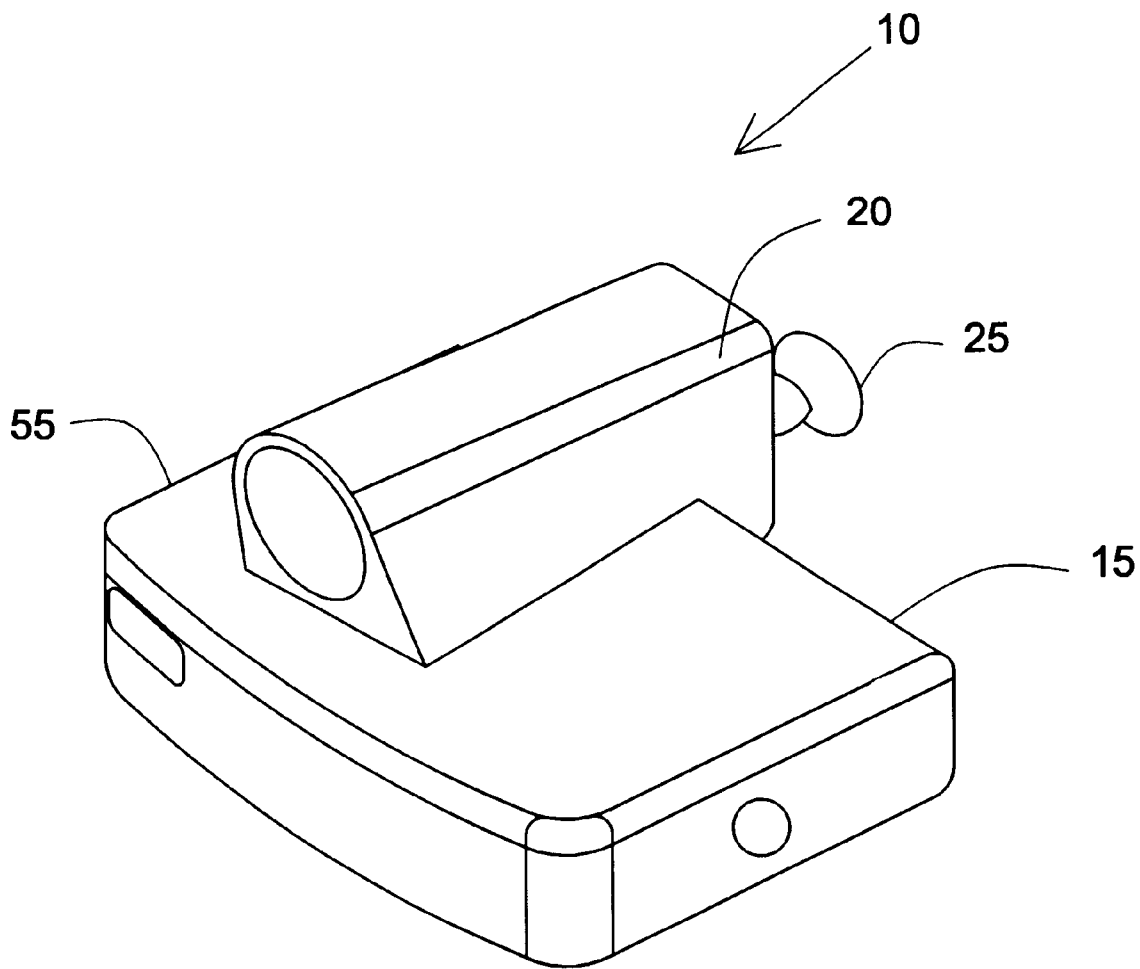
FIG. 1 is a front perspective view of hand held computer with see through display.

Turning now to FIG. 1, the hand held computer with see-through display will be described with reference to a first embodiment. FIG. 1 shows a front view of the portable computer 10. A housing 15 contains electronic elements and provides a handhold for the user. Integral with the top portion of the housing 15 is an optical system housing 20. The optical system housing 20 contains various optical components in a monocular arrangement. An eye piece 25 projects from the rear side of the optical system housing 20. This arrangement allows a user to grip the housing 15 and raise the unit to his eye. The user then looks though the eye piece 25 and views his surroundings at a magnification determined by the various optical components described hereinafter. By manipulating the eye piece 25 the user can adjust the focus. The housing 15 is weather resistant and is intended for outdoor/field conditions. Therefore it is preferable that housing 15 is formed from a metal casing or hard-shell plastic, however any suitable material is appropriate and may be defined for a specific application.

Figure 2:
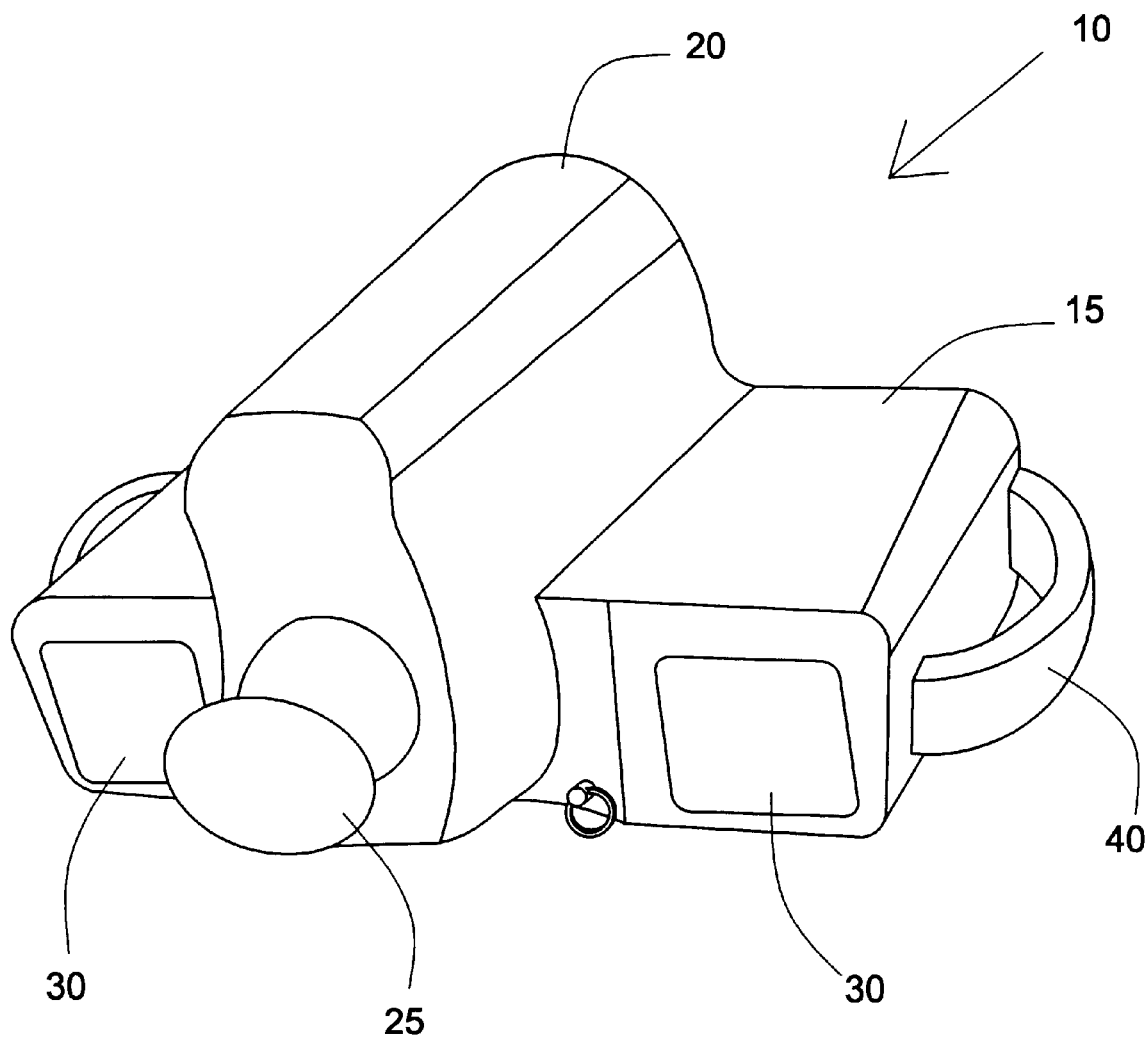
FIG. 2 is a rear perspective view of a hand held computer with see through display.

FIG. 2 shows a rear view of the portable computer 10. A user input device 30 is attached to the rear face of the housing 15 and allows the user to operate certain functions of the computer. While the user input device 30 could be a full keyboard, it is desirable to minimize the size of the housing 15 and various point and click devices, such as a mouse, joystick or touch pad, are preferable. The same user input device 30 appears on both the right and left side of the housing 15 and allows the user to manipulate either one (or both in combination) to enter data. Of course, the user input device 30 could be modified to have different input controls located on each side of the housing 15, in order to facilitate the entrance of larger amounts of data. This would simply be a function of the ultimate end use. The user input device 30 is shown having a series of switches and a pointing device, and is operated similar to a standard computer mouse. User input device 30 could be configured differently in accordance with a particular application of portable computer 10. An optional carrying strap 40 is shown attached to the side of housing 15. The carrying strap 40 can be attached to either side of the housing 15 and can be interconnected between the sides in order to form a neck strap.

Figure 3:
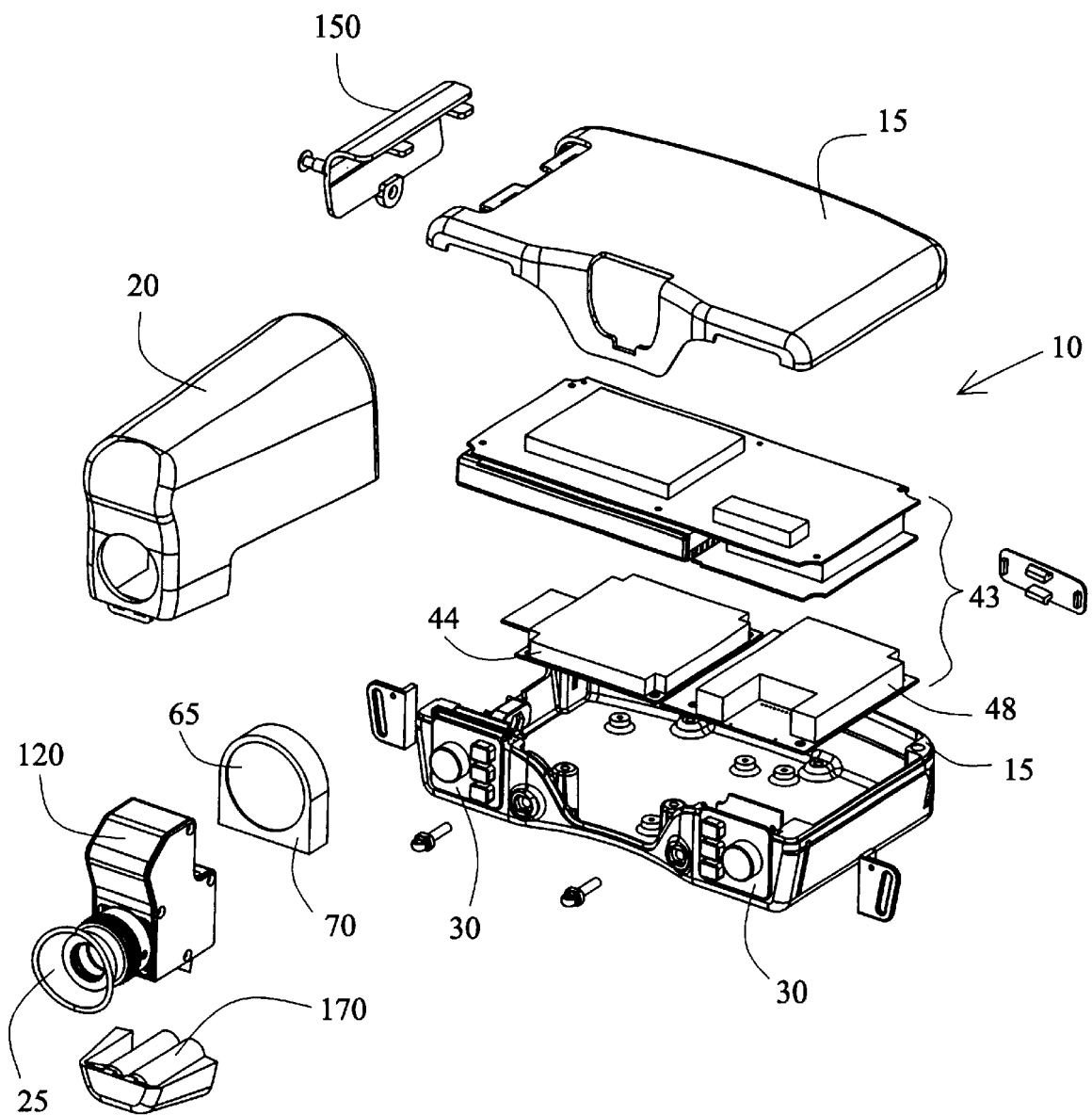
FIG. 3 is an exploded, perspective view of the components of the main housing of a hand held computer with see through display.

Turning now to FIG. 3, housing 15 is shown in an exploded view. A main processing unit 43 includes a motherboard 45 which is situated above a video display driver 50. Motherboard 45 can be configured in a variety of ways depending on the end use of the device. Here, the motherboard 45 is configured with an Intel 486 processor having 16 megabytes of RAM, 4 PCMCIA slots 44 and a 340 megabyte hard drive. Any of these features can be modified and there is no limit placed upon the processing speed. The video display driver 48 can also vary but ideally it should be capable of displaying in an at least 640×480 resolution. Various optional accessories can be added to the main processing unit 43 through the PCMCIA slots 44, such as a GPS card or a modem.

User input device 30 is the only integrated data entry device for the fully functioning portable computer 10, however, the device is intended and configured to be connectable to a separate stand-alone computer to effectuate rapid reprogramming. While any commercially available computer components can be configured to work in such an arrangement, it is desirable to select those which can be packaged into a relatively small area, since the portable computer 10 is intended for hand held use.

Figure 4:
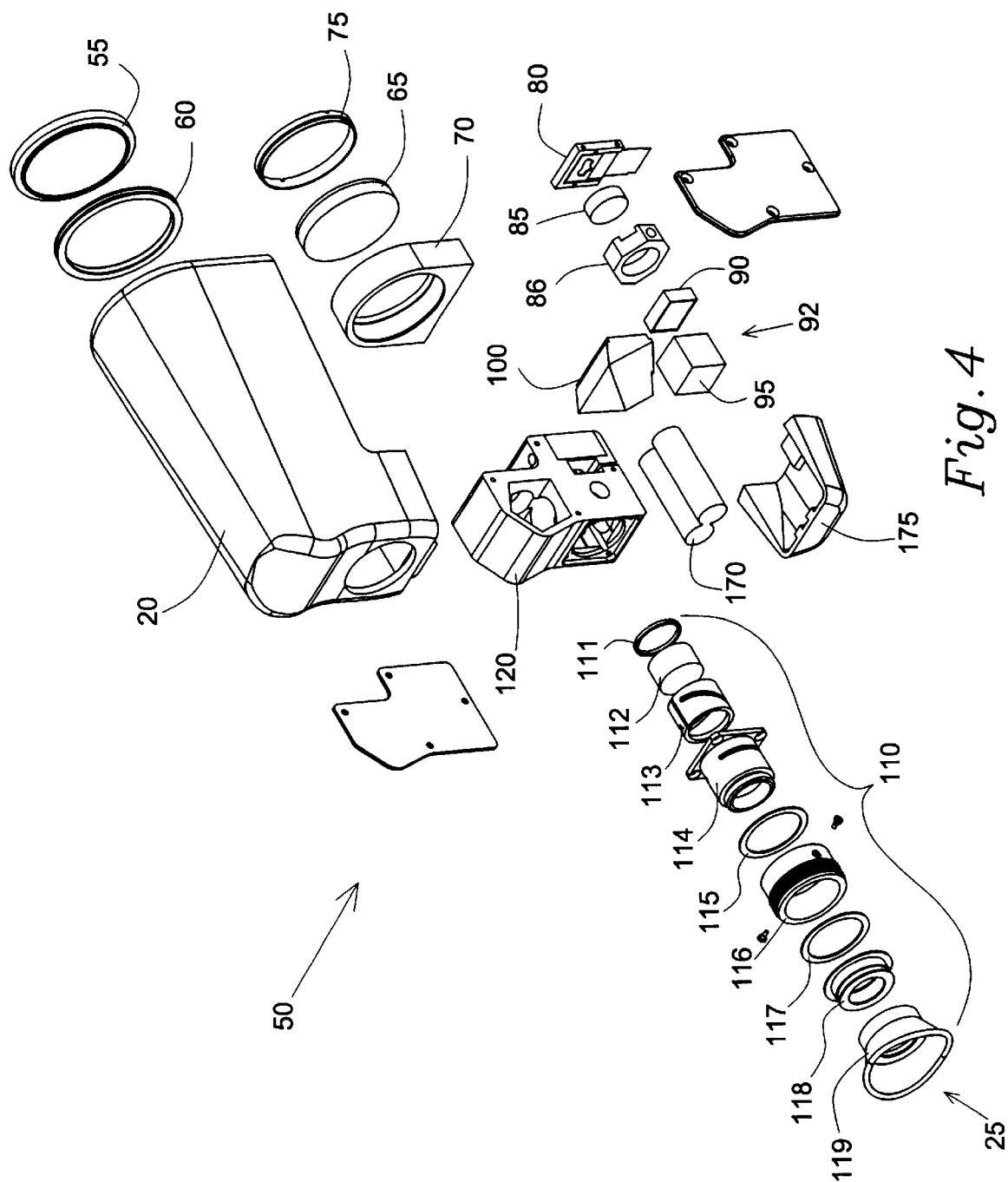
FIG. 4 is and exploded, perspective view of the optical components of a hand held computer with see through display.

Turning now to FIG. 4, the components of the optical system 50 will be described. Light from a viewable image first passes through a filter 55 which is connected to the optical system housing 20 by a filter ring 60. Various commercially available filters can be selected from. The filter 55 serves to protect the optical components and to enhance the perceived image by removing undesirable characteristics. Ideally, the filter 55 is mounted at an angle with respect to the housing 15 in order to minimize glare. The light then passes through an objective lens 65 which is held in place in an objective lens holder 70 by an objective lens ring 75. Simultaneously, the video driver 48 is driving a color video display 80. Light from the display 80 is focused through a focusing lens 85, held in place by lens mount 86, and subsequently passes through an LCD color filter 90. The focusing lens 85 can also be configured to adjust the magnification of the image so as to present the largest and sharpest image which corresponds to the total viewing area of the eye piece 25.

Light from the objective lens and light passing through the LCD color filter are then merged through an arrangement of a beam splitter 95 and a pentaprism 100. The merged light then passes through an eye piece optical system 110 and is then viewed by the user. The pentaprism 100 also serves to erect the image of the outside view, which had been inverted by the objective lens 65.

The final image viewed by the user consists of a superimposed image of his surroundings and the image produced by the video display 80. The relative intensities of the component images can be controlled by changing the beam splitter 95 (various beam splitters allow for different percentages of light to pass in a given direction) or increasing or decreasing the intensity of the image projected by the video display 80. Alternatively, LCD shutters (not shown) could be inserted into one or both light paths. The LCD shutters are electronically controlled to vary their level of translucence and would give the operator the ability to externally adjust the intensity of the separate components of the final image.

A color image from the video display 80 is produced by incorporating an LCD color filter 90 between the display 80 and the eye piece 25. The video display 80 displays a color sequential image. Then the LCD filter 90 cycles between red, green, and blue at a fast enough rate so as to cause the human eye to perceive a normal color image. While such a filter 90 reduces the intensity of the display, the image is still sufficiently intense to be clearly viewed in the eye piece, which eliminates most of the existing ambient light. Here an Active Matrix Electroluminescent (AMEL) display, made by Planar, Inc. was used as the video display 80. Any appropriately sized display could be adapted into the system, including those which produce a projectable or reflectable image, rather than a projected image (luminescent).

The beam splitter 95, the pentaprism 100, focusing lens 85, LCD color filter 90 and video display 80 are mounted in a prism housing unit 120 which is inserted into the rear most portion of the optical light transmission housing 20. Eye piece lens system 110 includes a mounting ring 111 which couples an eye piece 112 to prism housing 120. A lens ring 113 surrounds lens 112 and is held in place near prism housing 120 by lens bracket 114. O-ring 115 couples focusing ring 116 to lens bracket 114. Focusing ring 116, lens bracket 114, and lens ring 113 cooperate together to adjust the focus of the image viewed through the eye piece. Eye cup 119 is connected via connecting ring 118 to the focusing ring 116. All of the elements of the eye piece lens system 110 are coupled to the prism housing 120 and subsequently coupled to the housing 15 as well as the optical light transmission housing 20. A battery unit 170 is contained in a battery compartment 175 and provides the necessary power to operate the various electronic components.

Figure 5:
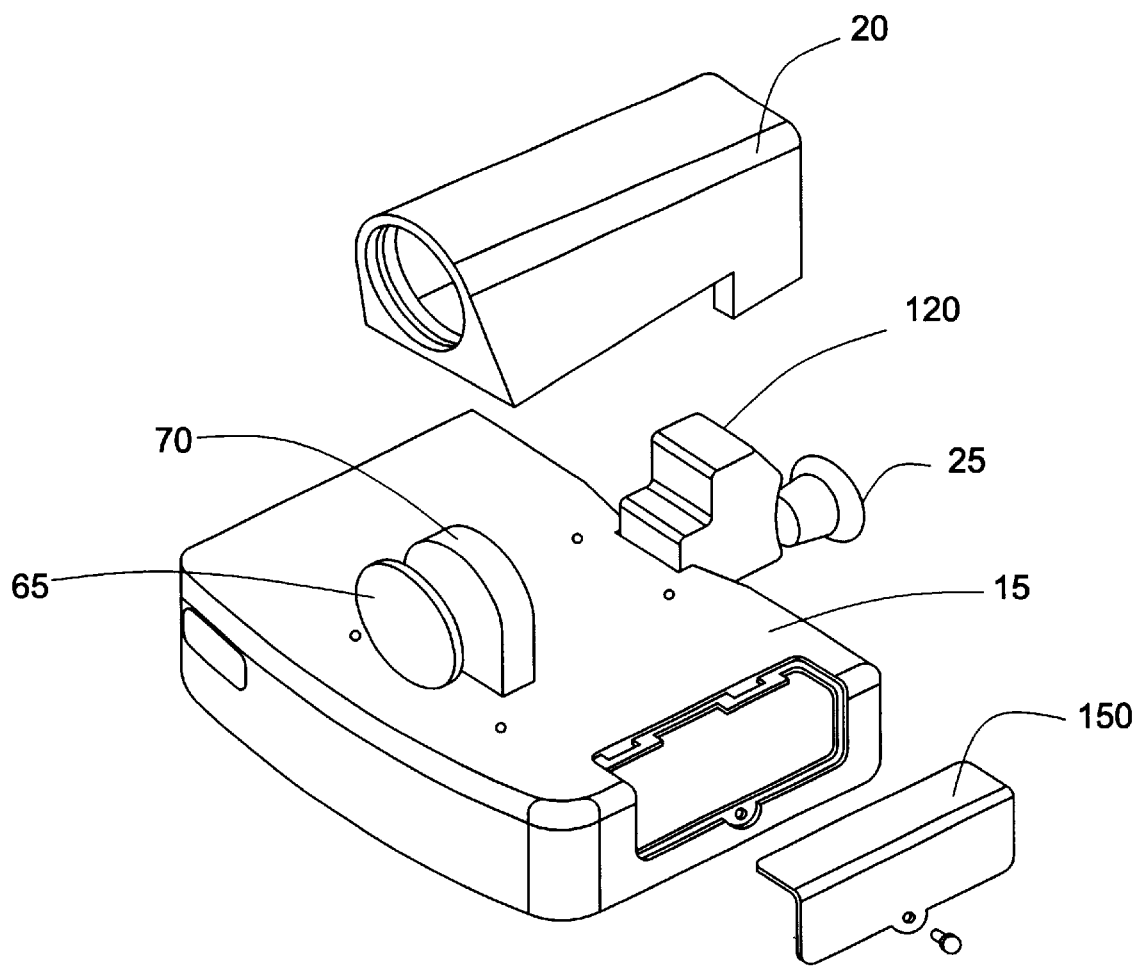
FIG. 5 is a front perspective view of the main housing components of a hand held computer with see through display.

Turning now to FIG. 5, the portable computer 10 is shown with access panel 150 disengaged from the main housing 15.

Such access allows for the insertion and removal of interchangeable components as well as allowing an interconnection between the portable computer 10 and a separate computer. By connecting the portable computer 10 to a separate computer, larger amount of data entry or reprogramming can be accomplished in an easier fashion than by solely using user input device 30. Furthermore, information acquired by portable computer 10 during field use can be downloaded in this fashion.

The portable computer 10 is intended to be carried and manipulated in a manner similar to a pair of binoculars. The portable computer 10 can be supported by carrying strap 40, either by hand or around the user's neck. The operator simply raises the portable computer 10 to eye level and looks through the eye piece 25. The master power switch turns on only the computer, the switch on the top turns on the miniature display and wakes up the computer from standby mode. When the master power switch is on, the computer stays on in a low power standby mode when either membrane switch is pressed, the computer wakes up from standby mode and the miniature display is turned on. The device has a master power switch to turn on and entirely shut down the portable computer 10. The device also has a secondary switch which toggles the portable computer 10 from a standby mode. The secondary switch can be a standard control, manipulated by hand or it could be toggled by contact with the eye piece 25. Such a standby mode would serve to prevent unnecessary power consumption. In the present embodiment, both switches are incorporated into user input device 30.

Once engaged, the operator looks through eye piece 25. What the operator will see is a display of the output from the main processing unit 43 merged with a view of his surroundings. By moving the portable computer 10 the view of his surroundings will change correspondingly (the same as if looking through a standard monocular or binocular device). By manipulating the user input device 30, the operator changes the computer display and/or engages the various functions of the software being employed.

Such a combination would have a wide variety of uses. For instance, a landscaper or architect could view an undeveloped sight and with the computer processor superimpose an image of a new development and gain a perspective of what the completed project would actually look like. Alternatively security personal could view large areas, such as a parking lot, and by comparing the current real time view to a previously taken image superimposed with it, easily and quickly determine any changes that may have occurred. Security could also scan a crowd and have various images of targeted individuals for instant comparison. Soldiers in the field can use the device, without fear of detection and without having to focus solely on a display. Add on computer components, such a GPS card and associated antenna can provide the soldier with real time positional information as well as his relationship to others, outside his field of view. Finally, electronic communications can be added to remotely link the portable computer 10 with other computer systems allowing the operator to receive a continuous stream of current information while maintaining a real world perspective.

The portable computer 10 can also be used in a singular mode as well. For instance, if the optics are selected to provide a magnification factor, the device could be used solely as a monocular, without simultaneously viewing a computer generated display. Alternatively, the computer display could be viewed without superimposing another image, if the user wanted to focus solely on the software application at hand. This could be accomplished by simply covering the objective lens 65 or closing an internal shutter (not shown).

There are many possible alternative embodiments which incorporate the scope of the present invention. Rather than having a monocular viewing arrangement a binocular arrangement can be configured. Furthermore, other methods of viewing the operator's surroundings can be incorporated. For instance, a night-vision scope, an infrared detector, a digital camera or a video camera could be included. Any of these methods could be used alone or in combination with the presented standard lens arrangement.

Figure 6:
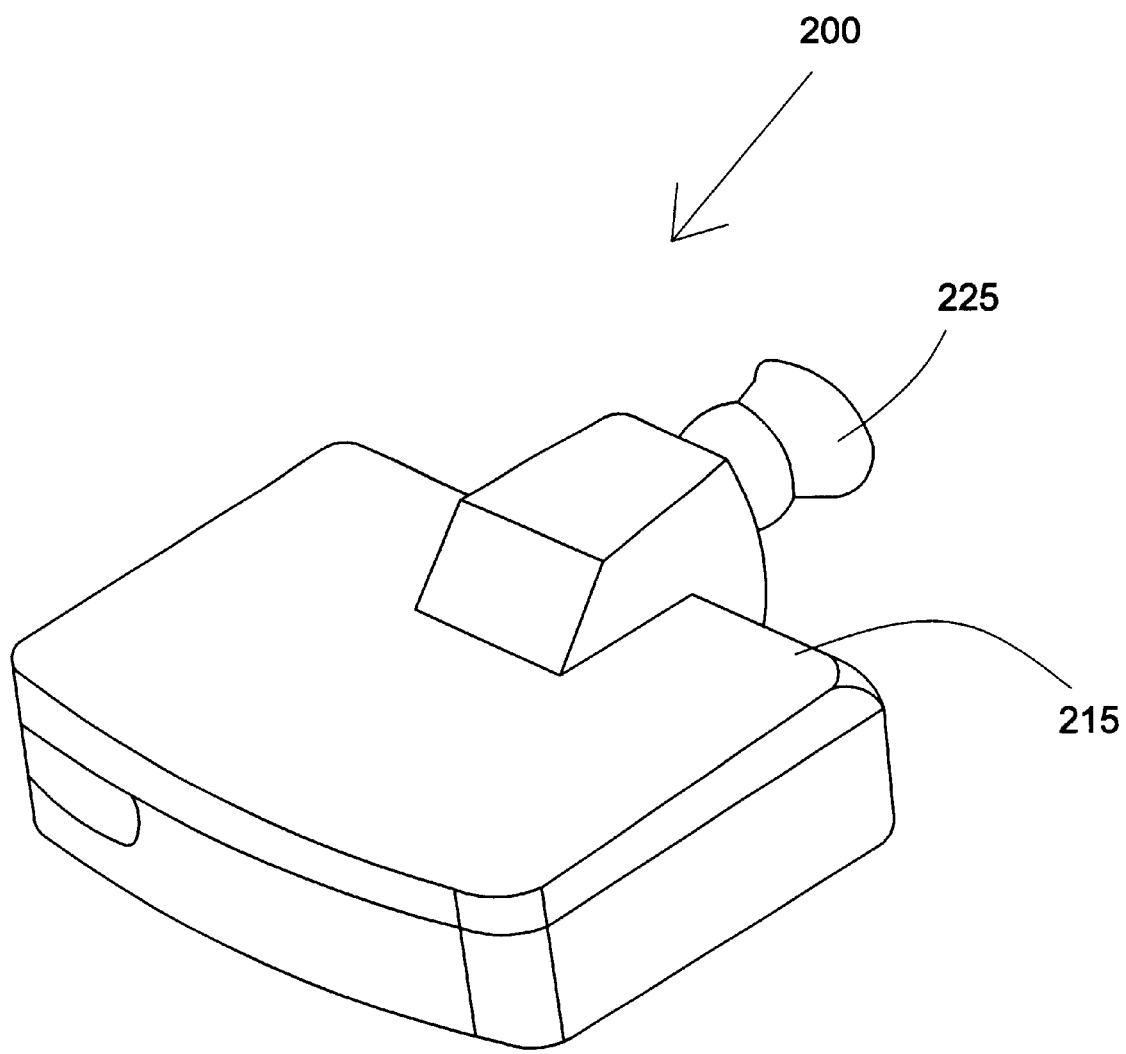
FIG. 6 is a front perspective view of a hand held computer having an eye piece display.

FIG. 6 shows a second embodiment of the present invention. The hand held computer 200 has a housing 215 which contains the same electronic components as shown in FIG. 3. An eye piece 225 is connected to the housing 215 and allows for the viewing of an electronic display generated by an internal computer. This arrangement allows for the easy manipulation of a hand held computer as well as providing for a non-obtrusive high resolution display. This embodiment is best suited for applications which require only the use of a computer in the field, and do not need the added ability to simultaneously view ones surroundings; or where the imaging device does not employ traditional optics which require external components.

Figure 8:
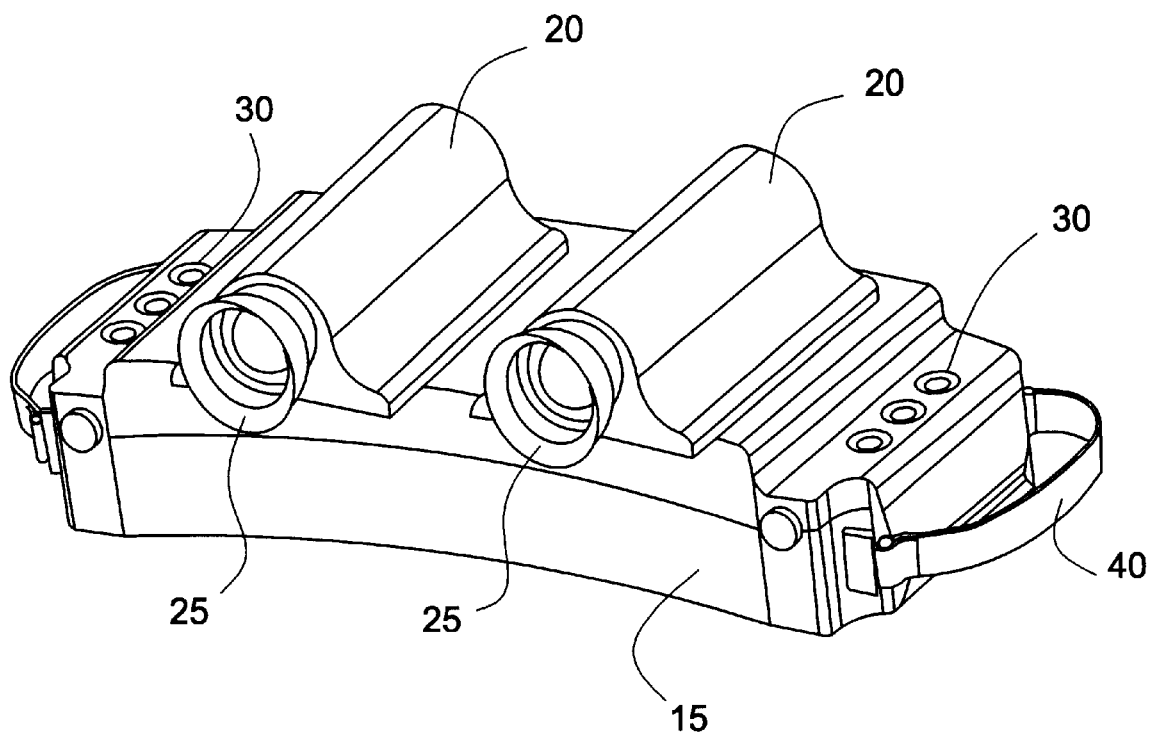
FIG. 8 is a perspective view of a binocular arrangement of a hand held computer having a see through display.

FIG. 8 shows a third embodiment of the present invention. The third embodiment is substantially similar to the first embodiment except that a binocular, rather than a monocular, arrangement has been presented. The housing 15 has two optical system housings 20, each containing an optical system 50 (see FIG. 4) attached to an upper surface. User input device 30 has been modified slightly, to show an alternative arrangement, however it functions identically to the first embodiment. A number of configurations are possible to interconnect the optical systems 20 with the display 80. A second beam splitter may be added, which splits the image from the display 80 into two image pathways, each traveling to a separate beam splitter 95, located in prism housing 120. Alternatively, a second display 80 could be connected to the main display driver 48. However connected, the binocular arrangement presents a stereo view of the operator's surroundings, with both the left and right side view being superimposed with a video display from the computer.

Those skilled in the art will further appreciate that the present invention may be embodied in other specific forms without departing from the spirit or central attributes thereof. In that the foregoing description of the present invention discloses only exemplary embodiments thereof, it is to be understood that other variations are contemplated as being within the scope of the present invention. Accordingly, the present invention is not limited in the particular embodiments which have been described in detail therein. Rather, reference should be made to the appended claims as indicative of the scope and content of the present invention.

What is claimed is:

1. A hand held computer having a see through display, allowing simultaneous viewing of a computer display and an operator's surroundings, comprising:
  a housing;
  an optical system coupled to the housing;
  a computer mounted in the housing;
  a display coupled to the computer and mounted in the housing; and
  a viewing assembly connected to the housing which allows an operator to view through the optical system and view the display simultaneously.

2. The hand held computer having a see through display of claim 1, further comprising an input device mounted on the housing and coupled to the computer, wherein the input device is used to control the functions of the computer.

3. The hand held computer having a see through display of claim 2, wherein the input device includes a first control mounted on a first side of the housing and a second control mounted on a second side of the housing, wherein the first and the second controls perform identical functions.

4. The hand held computer having a see through display of claim 2, wherein the input device includes a first control mounted on a first side of the housing and a second control mounted on a second side of the housing, wherein the first and the second controls perform different functions.

5. The hand held computer having a see through display of claim 1, wherein the optical system includes an objective lens mounted to the housing, wherein the viewing assembly includes an eye piece lens mounted to said housing, and further wherein light transmitted through the objective lens is directed through the eye piece lens.

6. The hand held computer having a see through display of claim 5, further including a beam splitter mounted in the housing and interposed between the objective lens and the eye piece lens and adjacent to the display, wherein light from the display and light transmitted through the objective lens is directed through the beam splitter and combined, the combined light subsequently being directed through the eye piece lens.

7. The hand held computer having a see through display of claim 6, wherein the display includes:
   a high resolution color sequential display;
   a focusing lens mounted adjacent the high resolution color sequential display; and
   an LCD color filter coupled to the high resolution color sequential display to produce the sequential elements of a full colored image.

8. The hand held computer having a see through display of claim 6, further including a pentaprism disposed between the beam splitter and the eye piece lens, wherein the pentaprism inverts the image directed through the beam splitter.

9. The hand held computer having a see through display of claim 6, having a monocular arrangement.

10. The hand held computer having a see through display of claim 6, having a binocular arrangement.

11. The hand held computer having a see through display of claim 1, further including an image combination system mounted in the housing for superimposing an image produced by the optical system with an image produced by the display, wherein the superimposed images are viewable through the viewing assembly.

12. The hand held computer having a see through display of claim 11, having a monocular arrangement.

13. The hand held computer having a see through display of claim 11, having a binocular arrangement.

14. The hand held computer having a see through display of claim 11, wherein the image combination system includes a beam splitter.

15. The hand held computer having a see through display of claim 11, wherein the image combination system includes a beam splitter optically aligned with a pentaprism.

16. The hand held computer having a see through display of claim 1 wherein the computer includes a microprocessor, a hard drive and a plurality of expansion slots.

17. The hand held computer having a see through display of claim 16, further including, a global positioning system card interfaced to the computer via one of the plurality of expansion slots.

18. The hand held computer having a see through display of claim 16, further including a modem interfaced to the computer via one of the plurality of expansion slots.

19. The hand held computer having a see through display of claim 1, having a monocular arrangement.

20. The hand held computer having a see through display of claim 1, having a binocular arrangement.

21. A hand held computer having a see through display allowing simultaneous viewing of a computer display and an operator's surroundings, comprising;
   a housing;
   an optical system, the optical system including an objective lens fixed to the housing, a pentaprism mounted in the housing for receiving light directed through the objective lens, and an eye piece lens system connected to the housing for viewing light directed through the pentaprism;
   a beam splitter mounted in the housing and optically aligned with the objective lens and the pentaprism;
   a computer mounted in the housing;
   a display driver coupled to the computer;
   a video display coupled to the display driver and mounted in the housing so that light projected from the video display is directed to the beam splitter;
   a LCD color filter coupled to the video display and mounted in the housing between the video display and the beam splitter; and
   a user input device mounted to the housing and coupled to the computer for allowing operation of various functions of the computer.

22. The hand held computer having a see through display of claim 21 wherein the computer includes a microprocessor, a hard drive and a plurality of expansion slots.

23. The hand held computer having a see through display of claim 22, further including a global positioning system card interfaced to the computer via one of the plurality of expansion slots.

24. The hand held computer having a see through display of claim 22, further including a modem interfaced to the computer via one of the plurality of expansion slots.

25. The hand held computer having a see through display of claim 21, having a monocular arrangement.

26. The hand held computer having a see through display of claim 21, having a binocular arrangement.

27. A hand held computer having a see through display allowing simultaneous viewing of a computer display and an operator's surroundings, comprising:
   a housing;
   an optical system mounted to the housing;
   a computer mounted in the housing;
   a computer display operably coupled to the computer and mounted in the housing for producing an image;
   an image combination system mounted in the housing and coupled to both the optical system and the computer display for producing a composite image from an image produced by the optical system and the image produced by the computer display; and
   a viewing assembly connected to the housing and coupled to the image combination system, wherein the viewing assembly allows for viewing of the composite image produced by the image combination system.

28. The hand held computer having a see through display of claim 27, having a monocular arrangement.

29. The hand held computer having a see through display of claim 27, having a binocular arrangement.

30. A hand held computer having a see through display allowing simultaneous viewing of a computer display and an operator's surroundings, comprising:

a housing;

optical system means for forming an optical image, the optical system mounted to the housing;

a computer mounted in the housing:

display means coupled to the computer for displaying an electronic image, the display means mounted in the housing;

image combining means for producing a composite image from an image produced by the optical system means and the image produced by the display means; and viewing means for viewing the composite image produced by the image combining means.

31. The hand held computer having a see through display of claim 30, having a monocular arrangement.

32. The hand held computer having a see through display of claim 30, having a binocular arrangement.

* * * * *